(12) United States Patent
Beckmann et al.

(10) Patent No.: US 8,812,786 B2
(45) Date of Patent: Aug. 19, 2014

(54) DUAL-GRANULARITY STATE TRACKING FOR DIRECTORY-BASED CACHE COHERENCE

(75) Inventors: Bradfod M. Beckmann, Redmond, WA (US); Arkaprava Basu, Madison, WI (US); Steven K. Reinhardt, Vancouver, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 373 days.

(21) Appl. No.: 13/275,538

(22) Filed: Oct. 18, 2011

(65) Prior Publication Data

US 2013/0097385 A1 Apr. 18, 2013

(51) Int. Cl.
*G06F 12/00* (2006.01)
(52) U.S. Cl.
USPC ............ 711/128; 711/E21.048; 711/E12.027; 711/E12.029; 711/145; 711/133
(58) Field of Classification Search
USPC ......................................................... 711/128
See application file for complete search history.

(56) References Cited

U.S. PATENT DOCUMENTS

| 8,032,498 B1* | 10/2011 | Armangau et al. | 707/690 |
| 2009/0089511 A1* | 4/2009 | O'Krafka et al. | 711/143 |
| 2011/0153946 A1* | 6/2011 | Solihin | 711/124 |

OTHER PUBLICATIONS

Cantin, et al., "Improving Multiprocessor Performance with Coarse-Grain Coherence Tracking", IEEE 2005.
Moshovos, A., "RegionScout: Exploiting Coarse Grain Sharing in Snoop-Based Coherence", ISCA 2005.
Cantin, et al., "Coarse-Grain Coherence Tracking: RegionScout and Region Coherence Arrays", IEEE 2006.
Zebchuk, et al., "A Framework for Coarse-Grain Optimizations in the On-Chip Memory Hierarcy", MICRO 2007.
Somogyi, et al., "Spatial Memory Streaming", ISCA 2006.
Wang, et al., "Guided Region Prefetching: A Cooperative Hardware/Software Approach", ISCA 2003.
Lin, et al., "Reducing DRAM Latencies with an Integrated Memory Hierarchy Design", HPCA 2001.
Somogyi, et al., "Spatio-Temporal Memory Streaming", ISCA 2009.
Laudon, et al., "The SGI Origin: A ccNUMA Highly Scalable Server", ISCA 1997.
Conway, et al., "Cache hierarchy and memory subsystem of the AMD Opteron processor", IEEE Micro, 30:16-29, 2010.
Jerger, et al., "Virtual Tree Coherence: Leveraging Regions and In-Network Multicast Trees for Scalable Cache Coherence", MIRCO 2008.

* cited by examiner

*Primary Examiner* — Reginald Bragdon
*Assistant Examiner* — Hamdy S Ahmed
(74) *Attorney, Agent, or Firm* — Volpe and Koenig, P.C.

(57) ABSTRACT

A system and method of providing directory cache coherence are disclosed. The system and method may include tracking the coherence state of at least one cache block contained within a region using a global directory, providing at least one region level sharing information about the least one cache block in the global directory, and providing at least one block level sharing information about the at least one cache block in the global directory. The tracking of the provided at least one region level sharing information and the provided at least one block level sharing information may organize the coherence state of the at least one cache block and the region.

16 Claims, 6 Drawing Sheets

DUAL-GRANULARITY STATE TRACKING FOR DIRECTORY-BASED CACHE COHERENCE

FIELD OF INVENTION

This application is related to cache replacement policy, and specifically to dual-granularity state tracking for directory-based cache coherence.

BACKGROUND

Conventional cache algorithms maintain coherence at the granularity of cache blocks. However, as cache sizes have become larger, the efficacy of these cache algorithms has decreased. Inefficiencies have been created both by storing information and data block by block, and by accessing and controlling on the block level.

Solutions for this decreased efficacy have included attempts to provide macro-level cache policies by exploiting coherence information of larger regions. These larger regions may include a contiguous set of cache blocks in physical address space, for example. These solutions have allowed for the storage of control information at the region level instead of storing control information on a block by block basis, thereby decreasing the storage and access necessary for the control information.

These attempts have been made to opportunistically maintain coherence at a granularity larger than a block size—typically 64 bytes. These attempts are designed to save unnecessary bandwidth, for example. Specifically, these attempts either incorporate additional structures that track coherence across multiple cache block sized regions or merge both region and individual cache block information into a single structure. When the region-level information indicates that no other caches cache a particular region, the snoops associated with certain requests may be deemed unnecessary, thus saving bandwidth.

For example, region coherence may be extended, such as using Virtual Tree Coherence, in a hybrid directory/snooping protocol where the directory assigned regions to multicast trees. Requests may be utilized within the tree to maintain coherence. Specifically, Virtual Tree Coherence may utilize region tracking structure and only track sharing information at the region level. Thus cache blocks within shared regions may not be assigned individual owners, and marked sharers for a region level must respond to all requests with that region.

The problem with these previous attempts is a failure to achieve the proper balance between storage overhead and bandwidth demand because these attempts only track sharing information at one level of granularity; either block or region. Therefore, there is a need to balance storage overhead and bandwidth demand by tracking sharing information at both block and region granularities.

SUMMARY OF EMBODIMENTS

A system and method of providing directory cache coherence are disclosed. The system and method may include tracking the coherence state of at least one cache block contained within a region using a global directory, providing at least one region level sharing information about the least one cache block in the global directory, and providing at least one block level sharing information about the at least one cache block in the global directory. The tracking of the provided at least one region level sharing information and the provided at least one block level sharing information organizes the coherence state of the at least one cache block and the region. The system and method may include updating at least one of the provided at least one region level and at least one block level sharing information based on changes in the cache storage of the at least one cache block. The system and method may include determining where an up-to-date copy of the at least one cache block resides based on the tracked coherence state of the at least one cache block.

A system and method of tracking sharing information at both the region and block level are disclosed. The system and method may include storing sharing information in a region address comprising an index portion of the address and a tag field, and providing a vector of block-level fields within a region entry, the block-level fields containing block-level sharing information for a corresponding block within the region. The system and method may include determining a region entry using at least one of the index and tag fields.

DETAILED DESCRIPTION OF THE PREFERRED EMBODIMENTS

The present embodiments may be directed to a directory storage that is organized to track sharing behavior both on individual cache blocks and on contiguous aligned regions of, for example, 1 KB to 4 KB in size. By utilizing two levels of information, the storage cost of tracking certain sharing information may be amortized to the region granularity instead of the block granularity.

Figure 1:
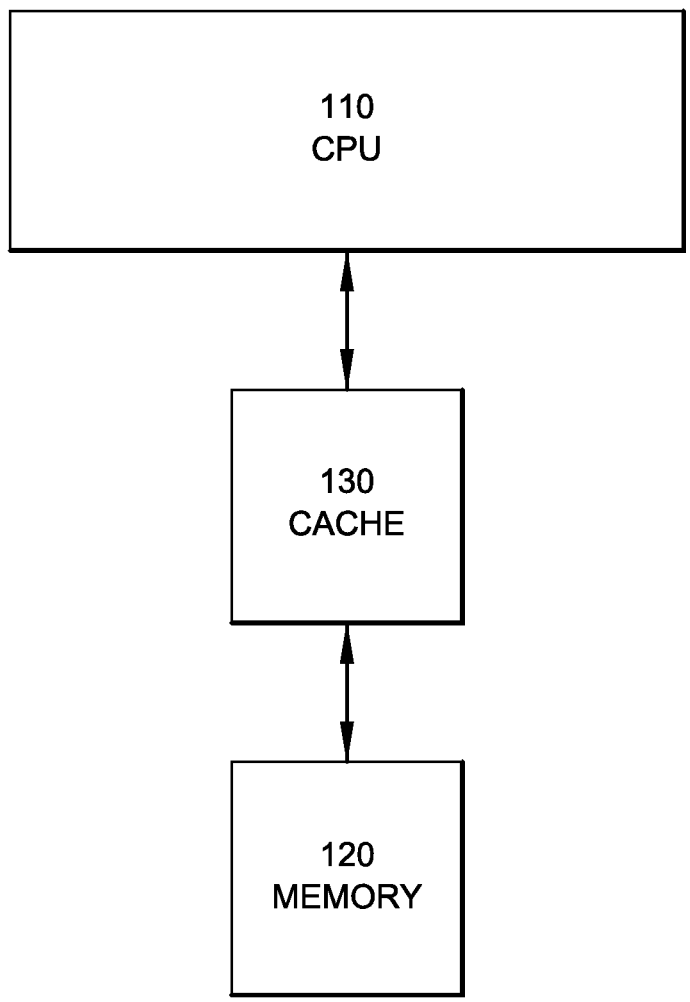
FIG. 1 illustrates a computer system including the interface of the central processing unit, main memory, and cache.

FIG. 1 shows a computer system 100 including the interface of the central processing unit (CPU) 110, main memory 120, and cache 130. CPU 110 may be the portion of computer system 100 that carries out the instructions of a computer program, and may be the primary element carrying out the functions of the computer. CPU 110 may carry out each instruction of the program in sequence, to perform the basic arithmetical, logical, and input/output operations of the system.

Suitable processors for CPU 110 include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

Typically, CPU 110 receives instructions and data from a read-only memory (ROM), a random access memory (RAM), and/or a storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and DVDs. Examples of computer-readable storage mediums also may include a register and cache memory. The computer-readable storage mediums or computer readable mediums comprise all computer-readable media except for a transitory, propagating signal. In addition, the functions within the illustrative embodiments may alternatively be embodied in part or in whole using hardware components such as ASICs, FPGAs, or other hardware, or in some combination of hardware components and software components.

Main memory 120, also referred to as primary storage, internal memory, and memory, may be the memory directly accessible by CPU 110. CPU 110 may continuously read instructions stored in memory 120 and may execute these instructions as required. Any data may be stored in memory 120 generally in a uniform manner. Main memory 120 may comprise a variety of devices that store the instructions and data required for operation of computer system 100. Main memory 120 may be the central resource of CPU 110 and may dynamically allocate users, programs, and processes. Main memory 120 may store data and programs that are to be executed by CPU 110 and may be directly accessible to CPU 110. These programs and data may be transferred to CPU 110 for execution, and therefore the execution time and efficiency of the computer system 100 is dependent upon both the transfer time and speed of access of the programs and data in main memory 120.

In order to increase the transfer time and speed of access beyond that achievable using memory 120 alone, computer system 100 may use a cache 130. Cache 130 may provide programs and data to CPU 110 without the need to access memory 120. Cache 130 may take advantage of the fact that programs and data are generally referenced in localized patterns. Because of these localized patterns, cache 130 may be used as a type of memory that may hold the active blocks of code or data. Cache 130 may be viewed for simplicity as a buffer memory for main memory 120. Cache 130 may or may not interface directly with main memory 120, although cache 130 may use information stored in main memory 120. Indirect interactions between cache 130 and main memory 120 may be under the direction of CPU 110.

While cache 130 is available for storage, cache 130 may be more limited than memory 120, most notably by being a smaller size. As such, cache algorithms may be needed to determine which information and data is stored within cache 130. Cache algorithms may run on or under the guidance of CPU 110. When cache 130 is full, a decision may be made as to which items to discard to make room for new ones. This decision is governed by one or more cache algorithms.

Cache algorithms may be followed to manage information stored on cache 130. For example, when cache 130 is full, the algorithm may choose which items to discard to make room for the new ones. In the past, as set forth above, cache algorithms often operated on the block level so that decisions to discard information occurred on a block by block basis and the underlying algorithms developed in order to effectively manipulate blocks in this way. As cache sizes have increased and the speed for access is greater than ever before, cache decisions may be examined by combining blocks into regions and acting on the region level instead.

Figure 2:
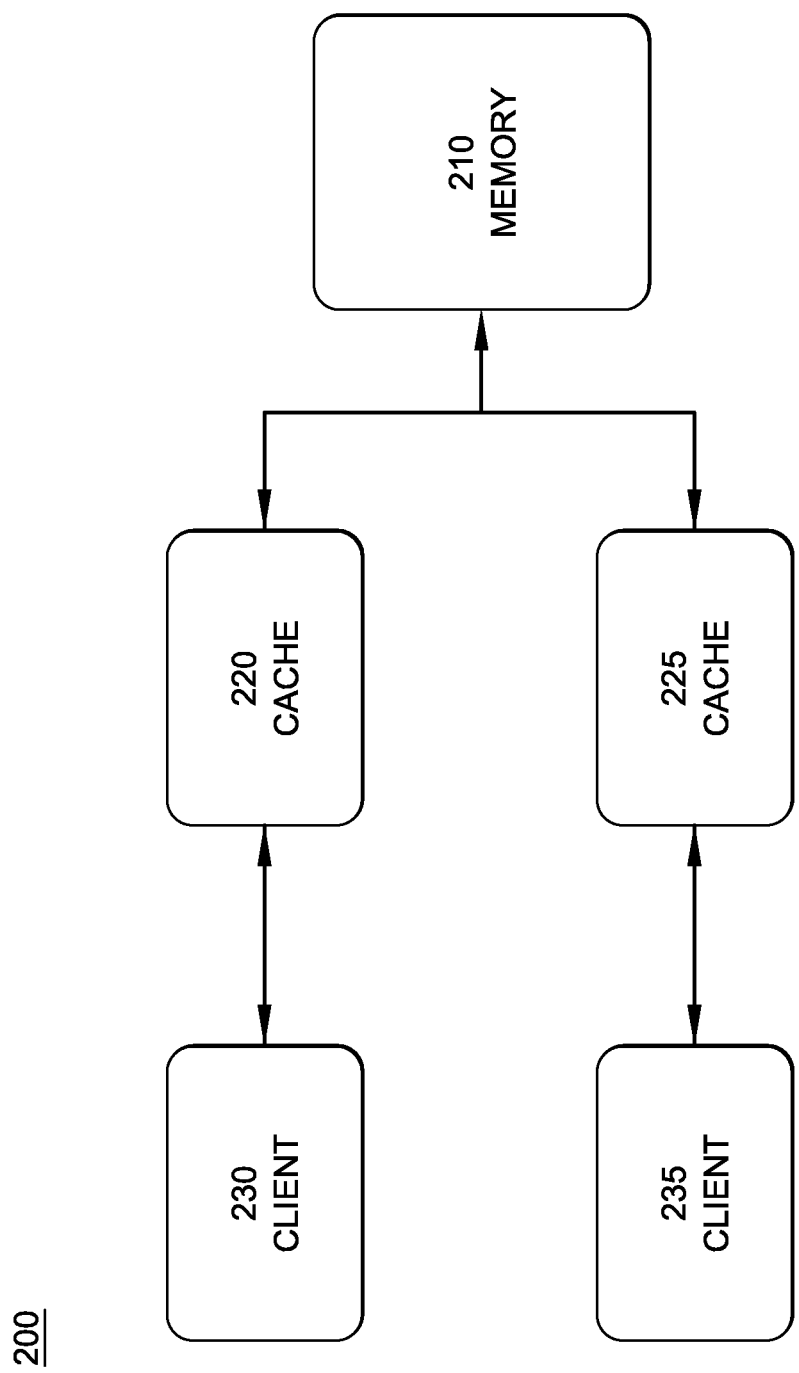
FIG. 2 illustrates a multiple cache structure sharing resources.

In computing, cache coherence refers to the consistency of data stored in local caches of a shared resource. When clients in a system maintain caches of a common memory resource, problems may arise with inconsistent data. This is particularly true of CPUs in a multiprocessing system. Referring to FIG. 2 there is illustrated a multiple cache structure 200 sharing resources. Multiple cache structure 200 may include a memory resource 210, a first cache 220, a second cache 225, a first client 230, and a second client 235. Caches 220, 225 may each be coupled to memory resource 210 having therein a plurality of memory blocks. Client 230 may be coupled to cache 220, and client 235 may be coupled to cache 225. In this example, if client 230 has a copy of a memory block from a previous read of memory resource 210 and client 235 changes that memory block, client 230 may be left with an invalid cache of memory without any notification of the change. Cache coherence is intended to manage this type of conflict and maintain consistency between cache and memory.

Coherence may define the behavior associated with reading and writing to a memory location. The following non-limiting examples of cache coherence are provided, and are provided for discussion.

Coherence may be maintained if a processor reads a memory location, following writing to the same location, with no other processors writing to the memory location between the write and read by the processor, when that memory location returns the value previously written by the processor. That is, that which is last written is returned.

Coherence may also be maintained if a second processor reads a memory location after a first processor writes to that memory location, with no processors writing to the memory location between the read and write, when that memory location returns the value previously written by the first processor. That is, the value that was last written is returned.

Coherence may also be maintained if writes to a memory location are sequenced. That is, if a memory location receives two different values, in order, by any two processors, a processor may never read the memory location as the second value and then read it as the first value, but instead must read the memory location with the first value and the second value in order.

In these examples, the conditions are configured under the auspice that the read and write operations are made instantaneously. In reality, this instantaneous access may be slowed by memory latency and other aspects of the architecture. For example, a write by one processor may not be seen by a read from another processor as the read is made proximate to the time the write has been made. Generally, implementing cache coherence dictates when a written value must be seen by a following read instruction made by the other processors.

In a directory-based system, the data being shared may be placed in a common directory to maintain the coherence between caches. The directory may act as a filter through which the processor queries to load an entry from the primary memory to the cache. When an entry is changed, the directory may update or invalidate the other caches with that entry, for example.

Snooping is a process where the individual caches monitor address lines for accesses to memory locations that have been cached. When a write operation is observed to a location that caches that which the observer caches, the cache controller invalidates the other copies of the snooped memory location.

Snarfing is where a cache controller watches both address and data in an attempt to update a copy of a memory location when a second master modifies a location in main memory. When a write operation is observed to a location that caches that which the observer caches, the cache controller updates the copy of the snarfed memory location with the new data.

Broadcast protocols, such as snooping and snarfing, may be faster than directory-based protocols, if enough bandwidth is available, since all interactions of read and write are broadcast to all processors. However, these broadcast protocols tend to be difficult to scale. Every request is broadcast to all nodes in a system, meaning that as the system gets larger, the size of the (logical or physical) bus and the bandwidth provided grows and the reliance on a central ordering point for all coherence requests may break down. Directory-based protocols may provide greater scalability by distributing order points to various directories. However, directory-based protocols may tend to have longer latencies for traveling to and accessing these ordering points. Directory-based protocols may use less bandwidth since messages are point to point and not broadcast. For this reason, many of the larger systems (>64 processors) may benefit from directory-based cache coherence.

A coherency protocol is a protocol which maintains the consistency between all the caches in a system of distributed shared memory. The protocol maintains memory coherence according to a specific consistency model.

Transitions between states in any specific implementation of these protocols may vary. For example, an implementation may choose different update and invalidation transitions such as update-on-read, update-on-write, invalidate-on-read, or invalidate-on-write. The choice of transition may affect the amount of inter-cache traffic, which in turn may affect the amount of cache bandwidth available for actual work. These affects may be considered in the design of distributed software and may cause strong contention between the caches of multiple processors.

Various models and protocols have been devised for maintaining cache coherence, such as MSI, MESI (also referred to as the Illinois protocol), MOSI, MOESI, MERSI, MESIF, write-once, Synapse, Berkeley, Firefly and Dragon protocols. To provide an understanding of cache operations several of these protocols will be discussed. While other protocols may be utilized, some protocols are discussed below to provide a framework for discussion. Any protocol including those above may be used in the present invention regardless of whether further discussion is included herein.

MSI refers to a basic cache coherence protocol with the letters in the name identifying the possible states for a cache. "M" refers to a cache block that has been modified, and as a result of the modification, the data in the cache is inconsistent with the memory. A cache block in state "M" therefore may be responsible for writing the cache block to the memory upon eviction. "S" refers to a cache block that is unmodified and exists in at least one cache. In this state, the cache block may be evicted without writing the data back to the memory. "I" refers to a cache block that is invalid. An invalid cache block may need to be retrieved from memory or another cache if the block is to be stored in the cache.

Each type of cache may have a different responsibility when blocks are read or written, or when cache are alerted to other caches reading and writing blocks of data. For example, when a read request arrives at a cache for a block in the "M" or "S" states, the "M" or "S" state cache may supply the data. If the block is not in the cache, such as if the cache is in the "I" state, for example, this cache may verify that the line is not in the "M" state in any other cache. This may be performed by snooping, such as where the read request is broadcast to all of the caches. The cache directory may have a directory that knows which cache last had copies of each particular cash block.

If another cache has the block in the "M" state, such a cache may write the data back to the memory and change from the "M" state to either the "S" or "I" states. Once data held in an "M" state is written, another cache may obtain the block from memory, or another cache in "S" state. Once obtained, the obtaining cache may then supply the data to the requesting client and then revert to the "S" state.

When a write request arrives at a cache for a block in the "M" state, the cache may modify the data locally. If the block receiving the write request is in the "S" state, the cache may notify other caches that might contain the block in the "S" state that the block must be evicted. This notification may be via bus snooping or a directory protocol. For example, a broadcast operation known as Request For Ownership (RFO) may be performed. Then the data may be locally modified at the "S" state cache. If the block is in the "I" state, the cache may notify any other caches that might contain the block in the "S" or "M" states that the block must be evicted. The block in the "I" state may then read the block and transition to the "M" state.

MESI refers to the cache protocol that builds on the basic MSI protocol by adding an exclusive "E" state. This exclusive "E" state may identify the most, recent correct copy of the data. The "E" state is similar to the "M" state in that the "E" state represents data in current form. While "M" data may need to be written back to memory before evicting to maintain the current data, "E" data may match the main memory.

A cache may satisfy a read from any state except "I." An "I" line must be fetched from "S" or "E" states to satisfy a read. A write may be performed if the cache line is in the "M" or "E" states. If the cache line is in the "S" state, other cached copies may be invalidated using an RFO first.

A cache that holds a line in the "M" state may snoop attempted reads from the other caches in the system of the corresponding main memory location and insert the data held in the "M" state. This may be achieved by forcing the read to back off (i.e. retry later), then writing the data to main memory and changing the cache line to the "S" state. A cache that holds a line in the "S" state may listen for invalidate for RFO broadcasts from other caches, and discard the line by moving the line into "I" state on a match. A cache that holds a line in the "E" state may intercept read transactions from other caches, and move the line to "S" state on a match.

The "M" and "E" states may match the true cache line ownership in the system. The "S" state may be imprecise such as if another cache discards an "S" line, the cache may become the sole owner of that cache line, but may not be promoted to "E" state, for example. Other caches do not broadcast notices when discarding cache lines, and a cache may not use such notifications without maintaining a count of the number of shared copies.

The "E" state may be an opportunistic optimization because if the processor wants to modify a cache line that is in "S" state, a bus transaction may be necessary to invalidate all other cached copies. "E" state may enable modifying a cache line with no bus transaction.

MOSI also builds from the basic MSI protocol by adding an owner "O" state. The "O" state identifies that the current processor owns the block and that that processor may service requests from other processors for the block.

The MESIF protocol is another cache coherency and memory coherence protocol. The "M," "E," "S" and "I" states are the same as in the MESI protocol. The forward "F" state is a specialized form of the "S" state, and indicates that a cache may act as a designated responder for any requests for the given line. The protocol ensures that, if any cache holds a line in the "S" state, exactly one cache may hold the line in the "F" state. In a system of caches employing the MESI protocol, a cache line request that is received by multiple caches holding a line in the "S" state may receive multiple responses. In a system of caches employing the MESIF protocol, a cache line request may be responded to by the cache holding the line in the "F" state.

MOESI is a cache coherency protocol that encompasses all of the possible states commonly used in the other protocols described. In addition to the four common MESI protocol states, there is a fifth "Owned" state representing data that may be both modified and shared. This "O" state may help avoid the need to write modified data back to main memory before sharing it. While the data may be written back eventually, the write-back may be deferred.

The "O" state may hold the most recent, correct copy of the data. The copy in main memory may thus be incorrect. Only one processor may hold the data in the "O" state—all other processors may hold the data in the "S" state. The cache line may be changed to the "M" state after invalidating all shared copies, or changed to the "S" state by writing the modifications back to main memory. "O" cache lines may respond to a snoop request with data.

This MOESI protocol, a more elaborate version of the simpler MESI protocol, may avoid the need to write a dirty cache line back to main memory upon attempted read by another processor. Instead, the "O" state may allow a processor to supply the modified data directly to the other processor. This is beneficial when the communication latency and bandwidth between two processors is significantly better than to main memory. An example would be multi-core CPUs with per-core L2 caches.

While MOESI may quickly share dirty cache lines from cache, MOESI may not quickly share clean lines from cache. If a cache line is clean with respect to memory and in the shared state, then any snoop request to that cache line may be filled from memory, rather than a cache.

If a processor wishes to write to an "O" cache line, that processor may notify the other processors that are sharing that cache line. Depending on the implementation, the processor may instruct the other sharing caches to invalidate copies thereby moving its own copy to the "M" state, or the processor may instruct the other sharing caches to update with the new contents leaving its own copy in the "O" state.

Figure 3:
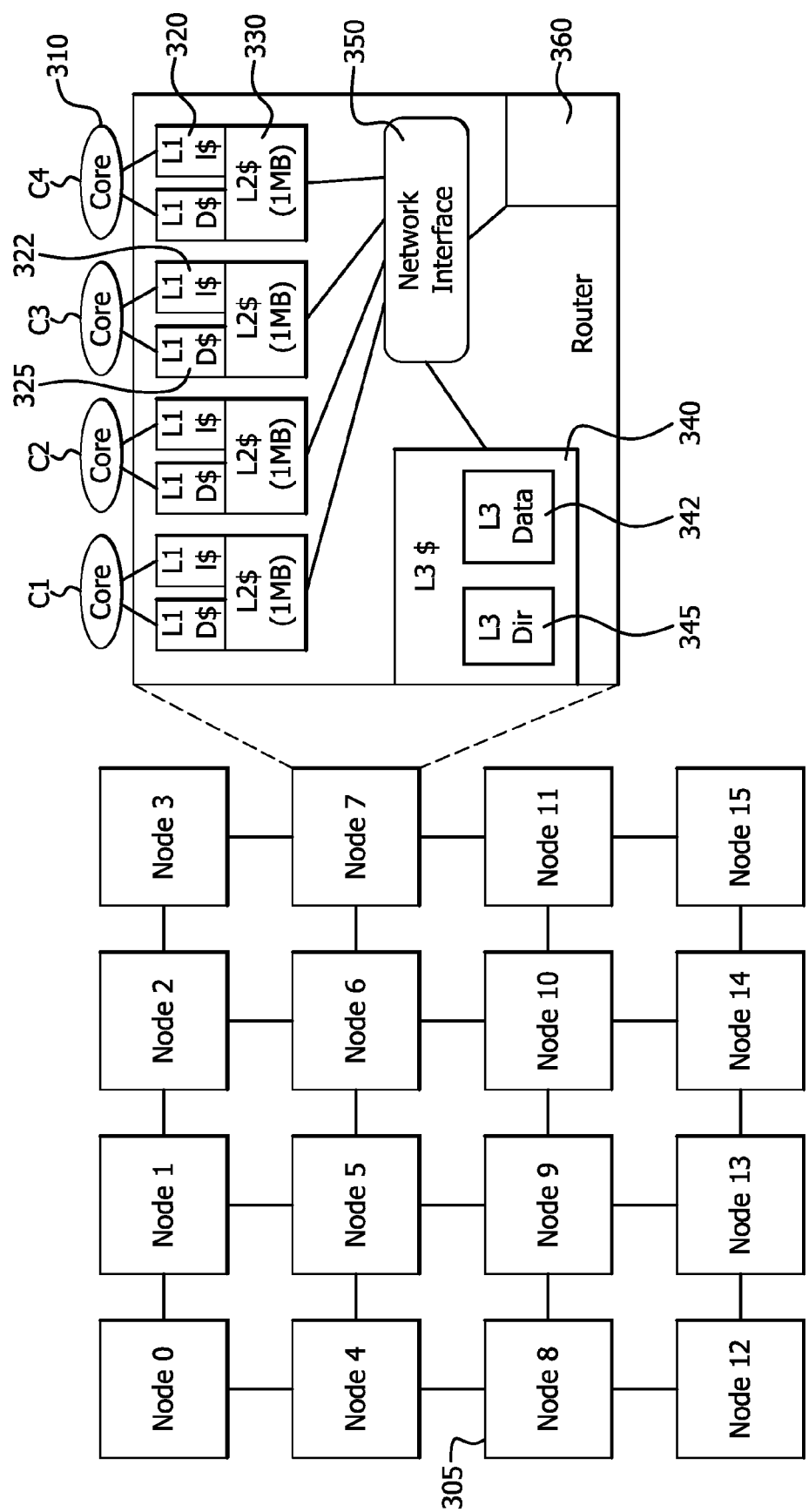
FIG. 3 illustrates a baseline architectural design of a core processor using directory protocols.

FIG. 3 is baseline architectural design of a core processor using directory protocols. Shown in FIG. 3 are sixteen nodes (identified as Node 0, Node 1, . . . , Node 15) 305. Node 7 is shown in an exploded view in FIG. 3. Each node may have a plurality of cores 310, although four are shown in FIG. 3 as C1, C2, C3 and C4 as an example, there may be more or less cores 310. The core 310 may have associated therewith a level 1 (L1) or primary cache 320, often the fastest type of cache, and may be located on the processor. L1 cache 320 may be split into two caches of equal size—one may be used to store program data, shown as L1 D$ 325, and another may be used to store microprocessor instructions, shown as L1 I$ 322. A unified L1 cache 320 may be used to store both data and instructions in the same cache (not shown).

Core 310 may also have a level 2 (L2) secondary cache 330. Generally, L2 cache 330 is larger than L1 320 and located between the processor and memory. A level 3 (L3) cache 340 may also be present and may be located between the processor and memory. Generally, L3 340 is slower and larger than L2 330. As shown in FIG. 3, L3 cache 340 may be sectioned into discrete parts including directory 345 and data 342, for example. As shown in FIG. 3, while L1 320 and L2 330 caches may be unique to core 310, such as C1, for example, L3 cache 340 may be shared by some or all of the plurality of cores 310 within a node. In FIG. 3, L3 cache 340 may be shared by cores C1, C2, C3, C4. As shown, FIG. 3 has 16 nodes, 64 cores, 128 L1 caches, 64 L2 caches, and 16 L3 caches. Maintaining coherence of these 208 caches requires a proper balance of storage overhead and bandwidth demand.

Directory cache coherence protocols may be scalable solutions to maintain data coherency for large multiprocessor systems. Directory protocols may achieve better scalability than snooping protocols because directory protocols may dynamically track the sharers of individual cache lines and may not need to broadcast to find the current sharers when the protocol necessitates intervention. As core and cache counts continue to scale, broadcast-based snooping protocols encounter even greater scalability challenges because both the total number of broadcasts and the number of destinations per broadcast increase. Thus directory protocols may provide the more attractive on-chip cache coherence solution for future many-core processors, such as is illustrated in FIG. 3.

While directory protocols demand significantly less bandwidth than snooping protocols, directory protocols may require extra metadata storage to track the current sharers. The exact amount of storage information required by the directory protocol may depend on the particular details of the protocol. For example, the SGI Origin's directory protocol maintains cache block sharing information on a per node basis for systems that are 64 nodes or smaller. Each node in such a system may be represented by a separate bit in a bit vector, and thus, the directory requires 64 bits of storage for each cache line in the system. To support systems with greater than 64 nodes, the SGI Origin protocol may group nodes into groups and represent each unique group of nodes as a separate bit in the bit-vector. When operating in this coarse-grain bit-vector mode, nodes within a group may be searched when the bit vector indicates that at least one sharer exists within the group of nodes. Similarly, to clear the bit within the coarse-grain bit vector, nodes within the group may be consulted and coordinated to ensure that there are no sharers of the block.

In contrast to the SGI Origin's directory protocol that tracks sharing information in a bit-vector, AMD's probe filter directory protocol may track a single sharer that is identified as the owner of the cache block. The owner may be the particular node responsible for responding to requests when one or more caches store the cache line. Using the full cache coherence protocol MOESI, which is a full cache coherency protocol that encompasses all of the possible states commonly used in other protocols, by way of an example, the owner may be the cache that has the block in M, O or E state. Without involving other caches, cache blocks in one of these three owner states may directly respond to read requests, and when in M or E state may also directly respond to write requests. These directed request-response transactions may be referred to as "directed probes." By storing only the owner information, the probe filter directory protocol may save significant storage as compared to other bit-vector solutions. For example in a 64-node system, the owner may be encoded in 6 bits, while the bit-vector requires 64 bits, leading to a 10× reduction in metadata storage. However, the cost of only storing the owner may necessitate a broadcast to potential sharers for certain operations, where the bit-vector solution only needs to multicast to the current sharers. Assuming the probe filter directory is located at the L3 cache and is inclusive with respect to the L1 and L2 caches, while the L3 data cache is non-inclusive with respect to the L1 and L2 caches, several specific probe filter operations may require broadcasts. These operations include write operations where more than one sharer exists; read or write operations where the owner data block has been replaced, but L1/L2 sharers still exist; and invalidation operations to maintain probe filter inclusion when a probe filter entry must be replaced for a cache block that at one time was shared by multiple cores.

Figure 4:
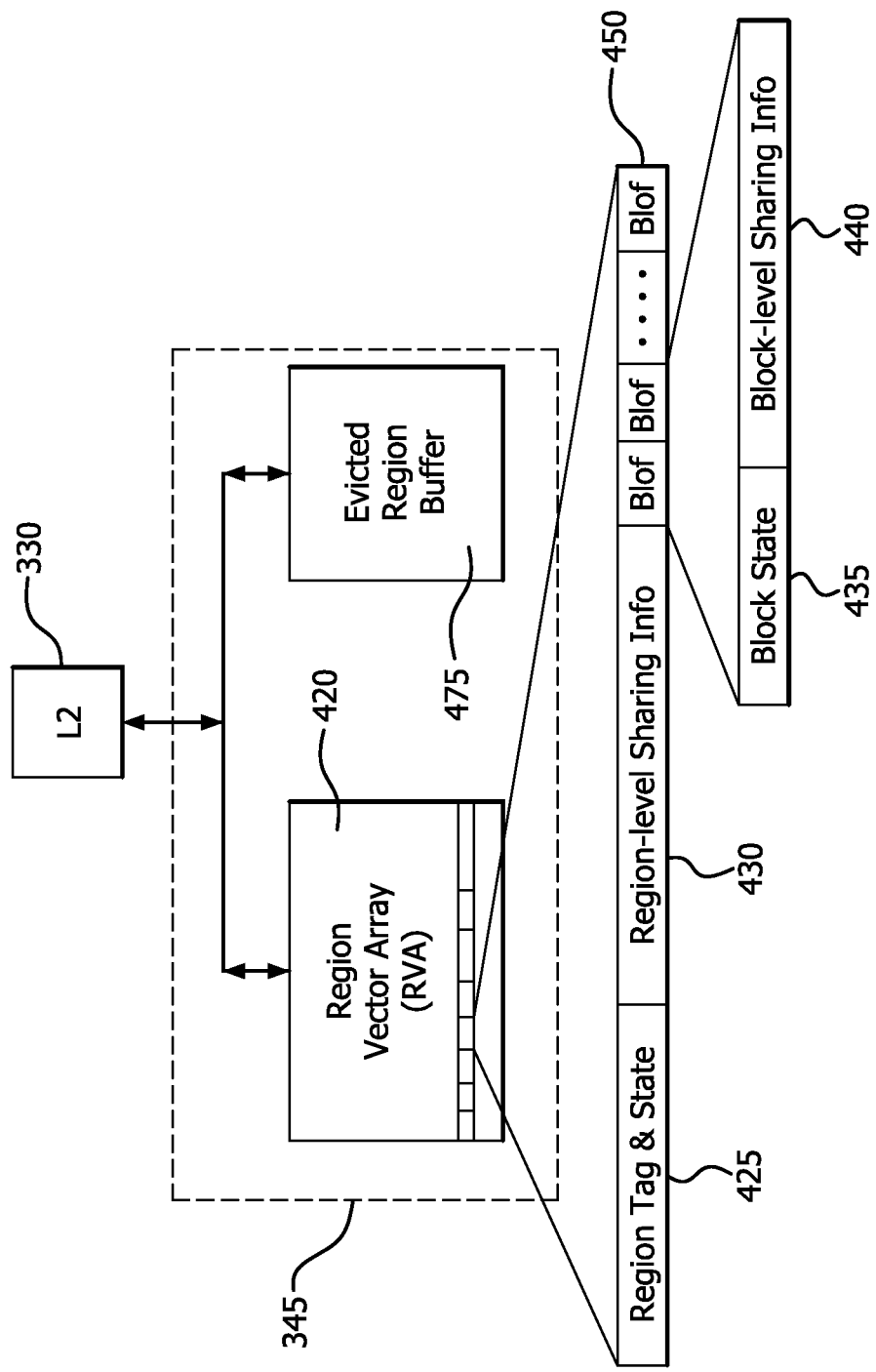
FIG. 4 illustrates a structure for home directory for tracking sharing information at both the region and cache block level.

FIG. 4 is structure for a home directory, such as for L3, for tracking sharing information at both the region and cache block level. As is illustrated in FIG. 4, L3 directory 345 may include region vector array (RVA) 420 and evicted region buffer 475. RVA 420 may include region tag and state information 425 and region-level sharing information 430. RVA 420 may also include block state 435 and block-level sharing information 440. RVA 420 may also include a vector of block-level fields (BLOFs) 450.

Cache row entries may have the structure [tag-data blocks-valid bit]. The data blocks (cache line) may contain the actual data fetched from the main memory, for example. The valid bit, sometimes referred to as the dirty bit, may designate that this particular entry has valid data. A memory address may be split into the tag, the index and the displacement (offset), such as [tag-index-displacement]. The index length may be log 2(cache_rows) bits and may identify the row storing the data. The displacement length may be log 2(data_blocks) and may specify which of the stored blocks are needed. The tag length may be address_length−index_length−displacement_length and may contain the most significant bits of the address. These most significant bits may be checked against the current row, such as the row retrieved by index, for example, to determine need, or if it represents another, irrelevant memory location that happened to have the same index bits.

The bandwidth demand of the directory protocol may be reduced by leveraging sharing information at both the region and block level. Further, lower storage overhead may be required than directory protocols that use bit vectors at the cache block granularity. FIG. 4 shows the specific structure for the home directory tracking sharing information at both the region and cache block level.

Region-level entries may be grouped into associative sets. Associativity may be a trade-off between misses and amount of resources devoted to searching. By way of example, if there are ten places that the replacement policy may have mapped a memory location, then all ten cache entries may be searched to check if that location is in the cache. Obviously, checking more places takes more power, chip area, and potentially time. Alternatively, caches with more associativity suffer fewer misses, so that the CPU wastes less time reading from the slow main memory. Generally, doubling the associativity, such as from direct mapped to 2-way, or from 2-way to 4-way, for example, has about the same effect on hit rate as doubling the cache size. Direct mapped caches may have faster hit times, and may provide benefit for larger caches, for example. Alternatively, fully associative caches may provide lower miss rates, and may provide benefit when the miss penalty is high. Two-way set associative cache, 2-way skewed associative cache, and 4-way set associative cache may provide a trade-off between direct mapping and fully associative caches.

The region address may include an index field and a tag field (at least a portion of tag and state field 425) to allow a region entry lookup in the same way a block address may be used to look up a block in a conventional cache. The region entry may contain region-level sharing information 430 and BLOFs 450, each of which may contain block-level sharing information 440 for the corresponding block within the region. The home directory structure tracks the global sharing state typical of a coherence directory.

By utilizing two levels of information, the storage cost of tracking certain sharing information may be amortized to the region granularity instead of the block granularity. Thus, incorporating sharing information at the region-level instead of the block-level may save some the storage overhead.

TABLE 1

| Type | Description | Size |
|---|---|---|
| Full bit-vector (FBV) | Each bit in the bit vector represents whether a particular node (L1/L2) is currently storing the cache line. | 64 bits |
| Coarse bit-vector (CBV) | Each bit in the bit vector represents whether a particular group of nodes (L1/L2) is currently storing the cache line. | 64/(nodes per group) bits = 16 bits |
| Owner field (O) | Encodes which node (or group of nodes) currently owns the cache block/region. | $\log_2$(nodes) = 6 bits |
| Counter (C) | Counts how many nodes (or group of nodes) currently share the cache block or region. | Region level-counter: $\log_2$(nodes) = 6 bits Block level-counter: $\log_2$(nodes * blocks per region) = 10 bits |

Referring now to Table 1 where there is shown four different types of sharing information that may be stored. Full and coarse-grain bit vectors may track the current sharers at either node or group granularity, respectively. Fundamentally, the fidelity of the bit vector trades off storage versus the bandwidth required to find a particular piece of data. Full Bit-Vector (FBV) refers to tracking where each bit in the bit vector represents whether a particular node is currently storing the cache line. Generally, the size of a FBV is 64 bits. Coarse Bit-Vector (CBV) refers to tracking where each bit in the bit vector represents whether a particular group of nodes is currently storing the cache line. Generally, the size of a CBV may be 64/(nodes per group) bits. In the case where there are four nodes per group, such as that shown in FIG. 4, the CBV is 64/4 bits or 16 bits.

In contrast to bit vectors, the owner field encodes only the owner of data. Specifically, the owner field may encode the node (or group of nodes) that currently owns the cache block/region. As such, the size of the owner field may be equivalent $\log_2$(nodes) and with 64 nodes, the size is 6 bits.

For read requests, where the directory identifies the data cached on-chip or write requests where only one on-chip copy exists, the owner field may uniquely identify the single node that may satisfy the request. For write requests, where the directory identifies that the requested data was at least at one point in time cached by multiple nodes, the request may be broadcast to all potential sharers since the directory may be unable to identify the nodes holding copies of the data. The owner field may necessitate broadcasts to maintain inclusion between the nodes and the directory when directory entries identifying multiple sharers are replaced.

A similar issue may exist with the coarse-grain bit vector when nodes within a group fail to coordinate replacements and thus the directory loses track of whether bits may be cleared when an upper-level cache replaces a block. To resolve this problem, a counter may be integrated to distinctly determine when no data copies exist. The counter may count how many nodes (or groups of nodes) currently share the cache block or region. A counter implemented at the region-level may be sized as $\log_2$(nodes) and with nodes=64 may result in a size of 6 bits. A counter implemented at the block-level may be governed as $\log_2$(nodes*blocks per region) which with 64 nodes and 16 blocks per region may be 10 bits.

Specifically, the counter may be incremented when a new copy is created and decremented when a copy is replaced. Thus if the counter is zero, the directory may ensure that no copies exist in the nodes and therefore eliminate the need to broadcast to maintain inclusion.

information tracked as FBV may have a size of 64 bits. Tracking this information using CBV may require 16 bits.

TABLE 2

| Block-level | Region-level | | | |
|---|---|---|---|---|
| | Full bit-vector (FBV) | Coarse bit-vector (CBV) | Counter (C) | None |
| Full bit-vector (FBV) | NA | NA | NA | Traditional MESI protocol with multicasts to block-level node sharers |
| Full bit-vector + Owner (FBVO) | NA | NA | NA | Traditional MOESI protocol with multicasts to block-level node sharers |
| Coarse bit-vector (CBV) | MESI protocol with group-level info with additional filtering by the region level full bit-vector | NA | MESI protocol with group-level info plus may identify when no on-chip sharers exist for region | MESI protocol with group-level sharing info |
| Coarse bit-vector + Owner (CBVO) | MOESI protocol with group-level info with additional filtering by the region level full bit-vector plus may identify when no on-chip sharers exist | NA | MOESI protocol with group-level info plus may identify when no on-chip sharers exist for region | Traditional MOESI protocol with group-level sharing info |
| Coarse bit-vector + Owner + Counter (CBVOC) | MOESI protocol with multicasts to intra-region node sharers plus may identify when no on-chip sharers exist for block | NA | NA | Traditional MOESI protocol with group-level info & may identify when no on-chip sharer exists |
| Owner (O) | MOESI protocol with multicasts to intra-region node sharers | MOESI protocol with multicasts to intra-region group sharers | MOESI protocol with broadcast & may identify when no on-chip sharers exist for region | AMD's Probe filter protocol |
| Owner + Counter (OC) | MOESI protocol with multicasts to intra-region node sharers plus may identify when no on-chip sharers exist for block | MOESI protocol with multicasts to intra-region group sharers plus may identify when no on-chip sharers exist for block | NA | Probe filter + identify when no sharers exist for cache block |
| Counter (C) | MESI protocol with multicasts to intra-region node sharers plus may identify when no on-chip sharers exist for block | MESI protocol with multicasts to intra-region group sharers plus may identify when no on-chip sharers exist for block | NA | Broadcast protocol that identifies when no sharers exist for cache block |
| None | MESI protocol with level-level info similar to Enright Jerger et al. [11] | Traditional MESI protocol with group-level info | Broadcast protocol except | Traditional broadcast protocol |

There are several different ways block-level and region-level sharing information may be combined to provide benefit as opposed to tracking sharing information exclusively at either the block-level or region-level. Table 2 enumerates several of these combinations and identifies which combinations of block-level and region-level information provide benefit. In particular, the rows of Table 2 describe the possible sharing information tracked at the block level and the columns of Table 2 describe possible sharing information tracked at the region level. Even though the number of rows outnumbers the number of columns, this should not imply that the region-level information may not be expanded. Table 2 is not intended to describe all possible combinations, but is instead intended to illustrate that many combinations of block-level and region-level sharing information may provide benefit. In the subsequent discussion, a reference to a block of the table may be made using the Region Level/Block Level designations. For example, CBV/O refers to the block of Table 2 using Coarse Bit Vector tracking at the region level and Owner tracking at the block level.

As set forth hereinbefore, the size needed for different types of sharing information varies. For example, sharing Owner tracking may require 6 bits. A counter at the region level may require 6 bits and a counter at the block level may require 10 bits. Based on the different sizes associated with the information that may be tracked, and in some cases where the information is tracked, determinations may be made and combined with the associated overhead and querying that may need to occur given the information that is being tracked. The combinations may provide further detail into this tradeoff.

By providing a counter at the region level, there is a loose count on the numbers of sharers on-chip. That is, the counter may monitor the regions that have a select cache block contained therein. This is beneficial at least in the event that when the counter is zero no on-chip sharers exist in the region. Use of a full bit-vector at the region level may provide information regarding intra-region node sharers, while using the coarse bit-vector at the region level may provide information regarding intra-region group sharers.

If the FBV or FBVO at the block level are tracked, it may be redundant to track any of the FBV, CBV, or C at the region level. Therefore, the six blocks in the table representing these combinations are labeled NA. Further, it may be redundant to track the counter at both the region level and the block level. As such, there are three blocks of overlap representing these combinations labeled NA. Additionally, tracking the CBV at the region level and at the block level may be redundant. As such, there are three blocks of overlap representing these combinations labeled NA.

The protocol and system described herein may include protection against tracking overlapping information at the region-level as compared with the block-level. That is, overlap may be prevented between the region-level bit-vector and the block-level owner for example. The region-level bit vector may be redundant with the block-level owner. As such the region-level bit vector may need to be set when non-owners share a block.

When tracking FBV at the block level using 64 bits with no tracking at the region level, the system may operate similar to a traditional MESI protocol described hereinbefore with associated multicasting to block level node sharers. When tracking FBVO at the block level using 70 bits with no tracking at the region level, the system may operate similar to a traditional MOESI protocol with associated multicasting to block level node sharers.

By tracking the CBV at the block level, the directory protocol may implement similar functionality to the MESI protocol with group-level sharing information. This CBV block level tracking may require 16 bits to store and track the relevant information. By including a FBV at the region-level, the protocol may provide MESI protocol functionality with group level information while providing additional filtering by the regional full bit-vector. This FBV/CBV tracking may require 80 bits to store the relevant tracked information. By implementing a counter at the region level, with CBV at the block level, the directory may provide a MESI protocol functionality with group-level information, and additionally, may provide the ability to identify when no on-chip sharers exist for a region. This combination of C/CBV may provide a loose count of the blocks with the data. C/CBV tracking may require 22 bits to store the relevant tracked information.

By tracking the CBVO for each cache block, the directory protocol may implement similar functionality to a MOESI protocol with group-level sharing information. CBVO tracked at the block level may require 22 bits. By including a FBV at the region-level, the protocol may operate similar to a MOESI protocol with group level information with additional filtering by the region level full bit-vector. Additionally, FBV/CBVO may provide the ability to identify when no on-chip sharers exist. FBV/CBVO tracking may require 86 bits to store the relevant tracked information. By implementing a counter at the region level, with CBVO at the block level, the directory may operate similar to a MOESI protocol with group-level information. Additionally, C/CBVO may identify when no on-chip sharers exist for a region. C/CBVO may require 28 bits to store the relevant tracking information.

By tracking the CBVOC for each cache block, the directory protocol may implement similar functionality to the traditional MOESI protocol with group-level information. Additionally, CBVOC tracked at the block level may identify when no on-chip sharer exists. CBVOC tracked at the block level may require 32 bits. By including a FBV at the region-level, the protocol may provide similar functionality to a MOESI protocol with multicasts to intra-region mode sharers. Additionally, FBV/CBVOC may identify when no on-chip sharers exist for a block. This FBV/CBVOC tracking may require 96 bits.

By tracking the owner for each cache block, the directory protocol may implement similar functionality to the Probe Filter protocol performing "directed probes" for certain transactions. This configuration of tracking O at the block level may require 6 bits. By including a bit-vector at the region-level, the protocol may filter broadcast requests to the subset of nodes that are identified by the bit-vector. This configuration of FBV/O may require 70 bits and CBV/O may require 22 bits. By implementing a counter at the region level, with owner at the block level, the directory may determine when copies of a region have been written back and thus a broadcast may not be necessary to maintain inclusion if that region is replaced. This C/O configuration may require 12 bits to track the shared information.

By tracking the owner and counter for each cache block, the directory protocol may implement similar functionality to the Probe Filter protocol performing "directed probes" for certain transactions, and additionally may identify when there are no sharers that exist. This configuration of tracking OC at the block level may require 16 bits. By including a bit-vector at the region level, the protocol may filter broadcast requests to the subset of nodes that are identified by the bit-vector and may identify when no on-chip sharers exist for a block. This configuration of FBV/OC may require 80 bits and CBV/OC may require 32 bits.

By tracking the counter for each cache block, the directory protocol may implement similar functionality to a broadcast protocol that identifies when no sharers exist for a cache block. This block level counter may require 10 bits. By including a bit-vector at the region-level, the protocol may operate with functionality similar to a MESI protocol that filters broadcast requests to the subset of nodes that are identified by the bit-vector. This configuration of FBV/O may require 74 bits and CBV/O may require 26 bits.

By providing no tracking at the block level, and no tracking at the region level, the directory protocol may function as a traditional broadcast protocol. This configuration may require zero bits since no information is being tracked. By adding in a counter at the region level, the protocol may operate as a broadcast protocol that may identify when no on-chip sharers exist. This configuration of C at the region level may require 6 bits. By including a bit-vector at the region-level, the protocol may operate with functionality similar to a MESI protocol that filters broadcast requests to the subset of nodes that are identified by the bit-vector. This configuration of FBV at the region level may require 64 bits and CBV at the region level may require 16 bits.

Figure 5:
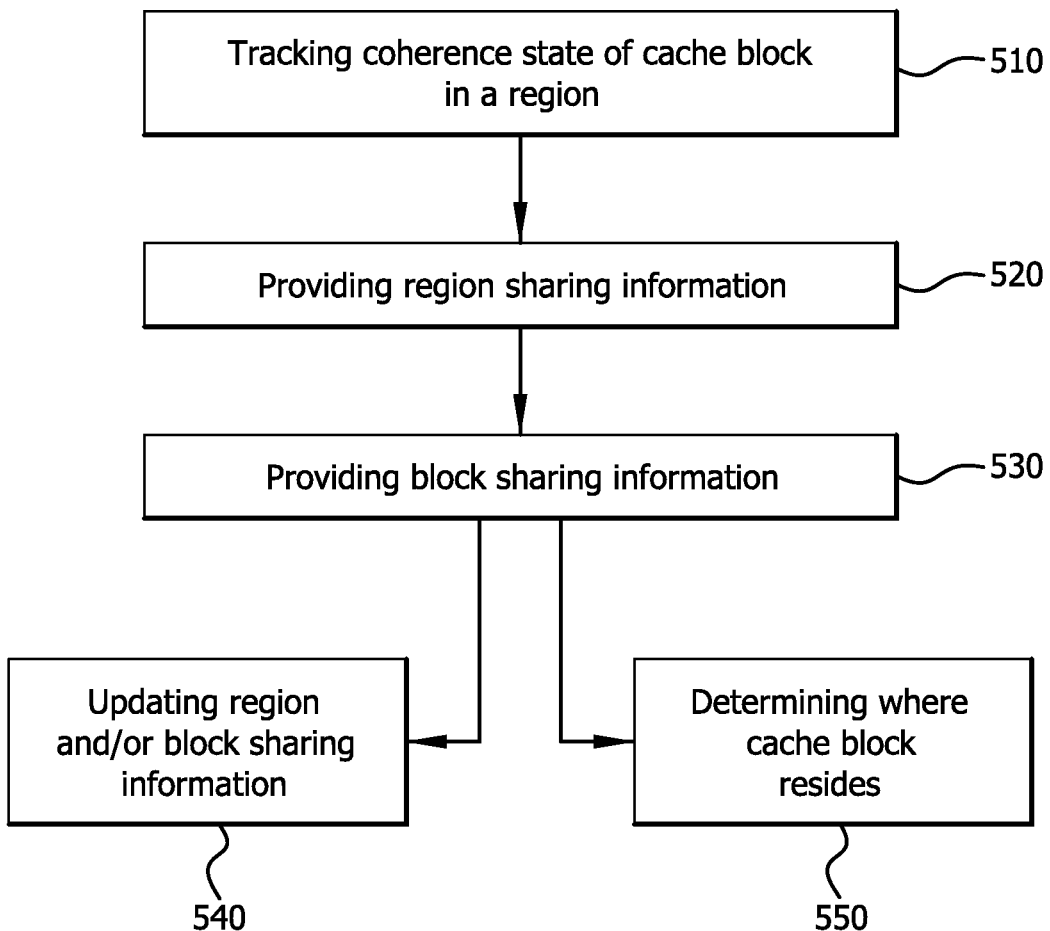
FIG. 5 illustrates a method of providing directory cache coherence balancing storage overhead and bandwidth demand.

FIG. 5 illustrates a method of providing directory cache coherence balancing storage overhead and bandwidth demand 500. Method 500 may include tracking the coherence state of at least one cache block contained within a region using a global directory at step 510. Method 500 may include providing at least one region level sharing information about said at least one cache block in the global directory at step 520. Method 500 may include providing at least one block level sharing information about said at least one cache block in the global directory at step 530. The tracking of the provided region level sharing information and provided block level sharing information may allow for organizing the coherence state of the cache block and the region. Method 500 may include updating at least one of the provided at least one region level and at least one block level sharing information based on changes in the cache storage of said at least one cache block at step 540. Changes in cache storage may include permitting a processor to load data from the primary memory to a cache in the directory cache. Method 500 may include determining where an up-to-date copy of said at least one cache block resides based on said tracked coherence state of said at least one cache block at step 550. While steps 540 and 540 may both be performed, these two steps are generally performed in the alternative. The provided sharing information 520, 530 may include an owner, bit-vector and/or counter. A counter may indentify when no on-chip sharers exist for said at least one cache block. An owner may enable multicasts for information to be directed solely to sharers.

Figure 6:
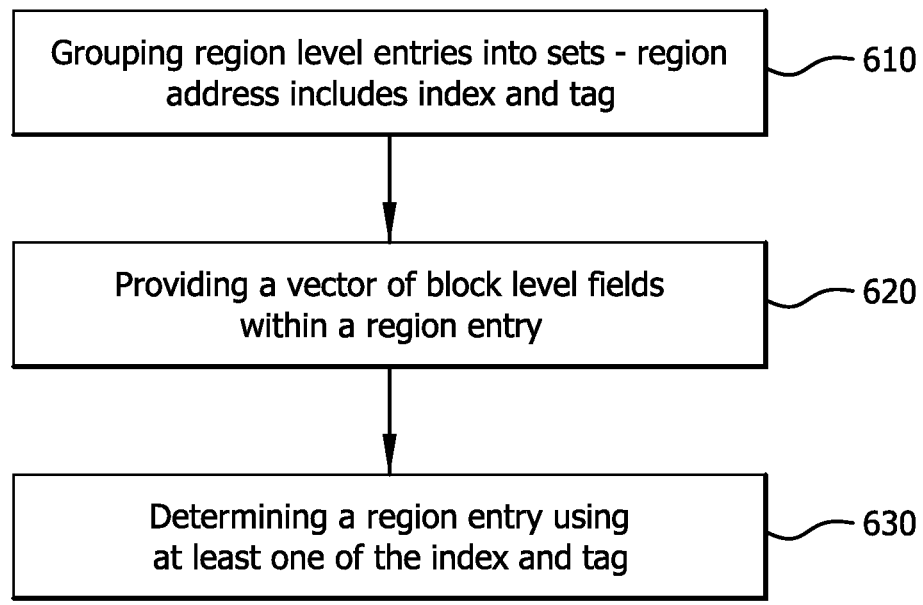
FIG. 6 illustrates a method of tracking sharing information at both the region and block level.

FIG. 6 illustrates a method of tracking sharing information at both the region and block level 600. The method 600 includes grouping region level entries into sets with a region address comprising an index field and a tag field, at step 610. These sets may be associative or direct mapped. That is, a 2-way set associative cache, an N-way set associative cache and/or a fully associative cache may be used. Method 600 may also include providing a vector of block-level fields within a region entry, at step 620. These block-level fields may contain block-level sharing information for a corresponding block within the region. Method 600 may also include determining a region entry using at least one of the index and tag fields, at step 630.

The present invention may be implemented in a computer program tangibly embodied in a computer-readable storage medium containing a set of instructions for execution by a processor or a general purpose computer. Method steps may be performed by a processor executing a program of instructions by operating on input data and generating output data.

Although features and elements are described above in particular combinations, each feature or element may be used alone without the other features and elements or in various combinations with or without other features and elements. The apparatus described herein may be manufactured by using a computer program, software, or firmware incorporated in a computer-readable storage medium for execution by a general purpose computer or a processor.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

While specific embodiments of the present invention have been shown and described, many modifications and variations could be made by one skilled in the art without departing from the scope of the invention. The above description serves to illustrate and not limit the particular invention in any way.

What is claimed is:

1. A method of providing directory cache coherence, said method comprising:
   tracking the coherence state of at least one cache block contained within a region using a global directory;
   providing at least one region level sharing information about said at least one cache block in the global directory; and
   providing at least one block level sharing information about said at least one cache block in the global directory,
   wherein said tracking of said provided at least one region level sharing information and said provided at least one block level sharing information organize the coherence state of the at least one cache block and the region,
   wherein at least one of said provided at least one region level sharing information and at least one block level sharing information comprise a counter, and wherein said counter identifies when no on-chip sharers exist for said at least one cache block.

2. The method of claim 1 further comprising updating at least one of the provided at least one region level and at least one block level sharing information based on at least one change in the cache storage of said at least one cache block.

3. The method of claim 2 wherein changes in cache storage comprise permitting a processor to load data from a primary memory to a cache in the directory cache.

4. The method of claim 1 further comprising determining where an up-to-date copy of said at least one cache block resides based on said tracked coherence state of said at least one cache block.

5. The method of claim 1 further comprising managing storage overhead at least one block level sharing information.

6. The method of claim 1 further comprising reducing bandwidth demand using at least one region level sharing information.

7. The method of claim 1 wherein at least one of said provided at least one region level sharing information and at least one block level sharing information comprise a bit-vector.

8. The method of claim 1 wherein at least one of said provided at least one region level sharing information and at least one block level sharing information comprise an owner.

9. The method of claim 8 wherein said owner enables multicasts for information to be directed solely to sharers.

10. A method of tracking sharing information of cache blocks at both the region and block level, said method comprising:
    storing sharing information in a region address comprising an index portion of the address and a tag field; and
    providing a vector of block-level fields within a region entry, said block-level fields containing block-level sharing information for a corresponding block within the region,
    wherein a region sharing information and block-level sharing information comprise a counter that identifies when no on-chip sharers exist for the block.

11. The method of claim 10 further comprising determining a region entry using at least one of the index and tag fields.

12. A non-transitory computer readable medium including hardware design code stored thereon which when executed by a processor cause the system to perform a method for providing directory cache coherence balancing storage overhead and bandwidth demand, said method comprising:
    tracking the coherence state of at least one cache block contained within a region using a global directory;
    providing at least one region level sharing information about said at least one cache block in the global directory; and
    providing at least one block level sharing information about said at least one cache block in the global directory,
    wherein said tracking of said provided at least one region level sharing information and said provided at least one block level sharing information organize the coherence state of the at least one cache block and the region, and
    wherein at least one of said provided at least one region level sharing information and at least one block level sharing information comprise a counter that identifies when no on-chip sharers exist for said at least one cache block.

13. The non-transitory computer readable medium of claim 12 further comprising updating at least one of the provided at least one region level and at least one block level sharing information based on changes in the cache storage of said at least one cache block.

14. The non-transitory computer readable medium of claim 12 further comprising determining where an up-to-date copy of said at least one cache block resides based on said tracked coherence state of said at least one cache block.

15. The non-transitory computer readable medium of claim 12 further comprising reducing bandwidth demand using at least one region level sharing information.

16. The non-transitory computer readable medium of claim 12 further comprising managing storage overhead at least one block level sharing information.

* * * * *

UNITED STATES PATENT AND TRADEMARK OFFICE
CERTIFICATE OF CORRECTION

| | | |
|---|---|---|
| PATENT NO. | : 8,812,786 B2 | |
| APPLICATION NO. | : 13/275538 | |
| DATED | : August 19, 2014 | |
| INVENTOR(S) | : Beckmann et al. | |

It is certified that error appears in the above-identified patent and that said Letters Patent is hereby corrected as shown below:

ON THE TITLE PAGE:

Item (75) Inventors, change "Bradfod" to -- Bradford --.

IN THE CLAIMS:

In claim 5, at column 16, line 15, after "at" insert -- at --.

In claim 16, at column 17, line 12, after "at" insert -- at --.

Signed and Sealed this
Twenty-first Day of October, 2014

Michelle K. Lee
*Deputy Director of the United States Patent and Trademark Office*